(12) United States Patent
Vervier et al.

(10) Patent No.: US 10,277,621 B2
(45) Date of Patent: Apr. 30, 2019

(54) SYSTEMS AND METHODS FOR DETECTING VULNERABILITIES ON SERVERS

(71) Applicant: Symantec Corporation, Mountain View, CA (US)

(72) Inventors: Pierre-Antoine Vervier, Biot (FR); Yun Shen, Berkshire (GB)

(73) Assignee: Symantec Corporation, Mountain View, CA (US)

( * ) Notice: Subject to any disclaimer, the term of this patent is extended or adjusted under 35 U.S.C. 154(b) by 181 days.

(21) Appl. No.: 15/647,303

(22) Filed: Jul. 12, 2017

(65) Prior Publication Data

US 2019/0020674 A1  Jan. 17, 2019

(51) Int. Cl.
*H04L 29/06* (2006.01)
*G06F 21/57* (2013.01)
*G06F 21/50* (2013.01)

(52) U.S. Cl.
CPC ........ *H04L 63/1433* (2013.01); *G06F 21/577* (2013.01); *H04L 63/1408* (2013.01); *G06F 21/50* (2013.01); *H04L 63/1425* (2013.01)

(58) Field of Classification Search
CPC ... H04L 9/0643; H04L 9/0861; H04L 9/3247; H04L 12/2823; H04L 63/1433; H04L 63/1408; H04L 63/1425; G06F 21/577; G06F 21/50; G06N 20/00; G06N 5/04
See application file for complete search history.

(56) References Cited

U.S. PATENT DOCUMENTS

2004/0181664 A1\* 9/2004 Hoefelmeyer ...... H04L 63/0272
  713/157
2015/0220850 A1\* 8/2015 Husain ................... G06N 5/003
  706/12

OTHER PUBLICATIONS

GITHUB; Frak (https://github.com/noprompt/frak); as accessed on Jun. 5, 2017.
Wikipedia; Sequence alignment—wikipedia https://en.wikipedia.org/wiki/Sequence_alignment; as accessed on Jun. 12, 2017.
CVE; Common Vulnerabilities and Exposures (https://cve.mitre.org/); as accessed on Jun. 12, 2017.
First.org; Common Vulnerability Scoring System (https://www.first.org/cvss); as accessed on Jun. 15, 2017.

(Continued)

*Primary Examiner* — Brian F Shaw
(74) *Attorney, Agent, or Firm* — FisherBroyles, LLP

(57) ABSTRACT

The disclosed computer-implemented method for detecting vulnerabilities on servers may include (i) sending requests to servers for information about services potentially executing on the servers, (ii) receiving, in response to requests, messages from the servers that comprise the information about the services, wherein the set of messages use different formats for transmitting the information, (iii) creating, by analyzing the set of the messages, at least one heuristic that is capable of automatically extracting, from a message, an identifier of a service that executes on a server that sent the message, (iv) extracting, from the message, via the heuristic, the identifier of the service executes on the server that sent the message, and (v) determining, based on the identifier of the service, that the service contributes to a vulnerability on the server that sent the message. Various other methods, systems, and computer-readable media are also disclosed.

20 Claims, 6 Drawing Sheets

(56) References Cited

OTHER PUBLICATIONS

Wikipedia; UPGMA—Wikipedia (https://en.wikipedia.org/wiki/UPGMA); as accessed on Apr. 26, 2017.
Wikipedia; Smith-Waterman Algorithm—Wikipedia (https://en.wikipedia.org/wiki/Smith—Waterman_algorithm); as accessed on Apr. 18, 2017.

* cited by examiner

SYSTEMS AND METHODS FOR DETECTING VULNERABILITIES ON SERVERS

BACKGROUND

Organizations around the world are increasingly at risk of suffering security incidents which can have severe consequences to their business operations and reputation. For example, an intrusion into an organization's network by an attacker that leads to a data breach may cause a decline in revenues and customers, a damaged reputation, and a host of other potential problems. As a first layer of defense, it is important to ensure that machines directly accessible from the public Internet, such as servers, are properly configured and secured. If organizations fail to protect their external (i.e., Internet-facing) network infrastructure, that infrastructure may create an easy point of entry for any attacker to penetrate the organization's internal network and further access and compromise other internal machines. As part of the reconnaissance phase of an attack against an organization, attackers may perform a software vulnerability assessment of the external infrastructure of the organization. Attackers may then leverage any vulnerabilities found to exploit the vulnerable machine, launch an attack on the organization's internal network, and access sensitive data.

Unfortunately, ensuring that every service executing on every public-facing server deployed by an organization is up-to-date and secure may be a difficult task for organizations with many servers. Traditional methods for detecting vulnerabilities on servers may be resource-intensive or inaccurate. The instant disclosure, therefore, identifies and addresses a need for systems and methods for detecting vulnerabilities on servers.

SUMMARY

As will be described in greater detail below, the instant disclosure describes various systems and methods for detecting vulnerabilities on servers.

In one example, a computer-implemented method for detecting vulnerabilities on servers may include (i) sending a set of requests to a set of servers for information about a set of services potentially executing on each server in the set of servers, (ii) receiving, in response to the set of requests, a set of messages from the set of servers that include the information about the set of services, where the set of messages use a group of different formats for transmitting the information about different services within the set of services, (iii) creating, by analyzing the set of the messages, at least one heuristic that is capable of automatically extracting, from a message, an identifier of a service within the set of services that executes on a server that sent the message, (iv) extracting, from the message, via the heuristic, the identifier of the service executes on the server that sent the message, and (v) determining, based on the identifier of the service, that the service contributes to a vulnerability on the server that sent the message.

In some examples, the computer-implemented method may further include performing a security action in response to determining that the service contributes to the vulnerability. In one example, performing the security action may include remediating the vulnerability on the server.

In some examples, the computer-implemented method may further include calculating a vulnerability score for an organization that owns the server by (i) identifying an additional set of servers that is made up of servers owned by the organization that owns the server, (ii) identifying a set of services by extracting, from at least one additional message sent from each server within the additional set of servers, via the heuristic, at least one additional identifier of at least one additional service executing on the server within the additional set of servers that sent the additional message, (iii) generating a set of vulnerabilities scores by determining, for each service in the set of services, a vulnerability score for a vulnerability contributed to by the service, and (iv) calculating the vulnerability score for the organization based on the set of vulnerability scores for the set of services executing on the servers owned by the organization. In one embodiment, the computer-implemented method may further include creating a temporal vulnerability metric for the organization that includes the vulnerability score for the organization and at least one previous vulnerability score for the organization and then ranking the temporal vulnerability metric for the organization against at least one temporal vulnerability metric for at least one additional organization.

In one embodiment, determining, based on the identifier of the service, that the service contributes to the vulnerability on the server that sent the message may include retrieving, from an external resource, vulnerability data for the set of services and using the identifier to locate the service in the vulnerability data. In some examples, creating the heuristic may include identifying a subset of formats within the different formats for transmitting the information, where the subset of formats includes similar formats, generating a signature for the subset of formats that matches information formatted using at least one format within the subset of formats, and creating, from the signature, the heuristic. In one embodiment, the signature may include a regular expression that locates the identifier of the service within the message.

In one embodiment, a system for implementing the above-described method may include (i) a sending module, stored in memory, that sends a set of requests to a set of servers for information about a set of services potentially executing on each server in the set of servers, (ii) a receiving module, stored in memory, that receives, in response to the set of requests, a set of messages from the set of servers that include the information about the set of services, where the set of messages use a group of different formats for transmitting the information about different services within the set of services, (iii) a creation module, stored in memory, that creates, by analyzing the set of the messages, at least one heuristic that is capable of automatically extracting, from a message, an identifier of a service within the set of services that executes on a server that sent the message, (iv) an extraction module, stored in memory, that extracts, from the message, via the heuristic, the identifier of the service executes on the server that sent the message, (v) a determination module, stored in memory, that determines, based on the identifier of the service, that the service contributes to a vulnerability on the server that sent the message, and (vi) at least one physical processor configured to execute the sending module, the receiving module, the creation module, the extraction module, and the determination module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) send a set of requests to a set of servers for information about a set of services potentially executing on each server in the set of servers, (ii) receive, in response to the set of requests, a set of messages from the set of servers that include the information about the set of services, where the set of messages use a group of different formats for transmitting the information about different services within the set of services, (iii) create, by analyzing the set of the messages, at least one heuristic that is capable of automatically extracting, from a message, an identifier of a service within the set of services that executes on a server that sent the message, (iv) extract, from the message, via the heuristic, the identifier of the service executes on the server that sent the message, and (v) determine, based on the identifier of the service, that the service contributes to a vulnerability on the server that sent the message.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
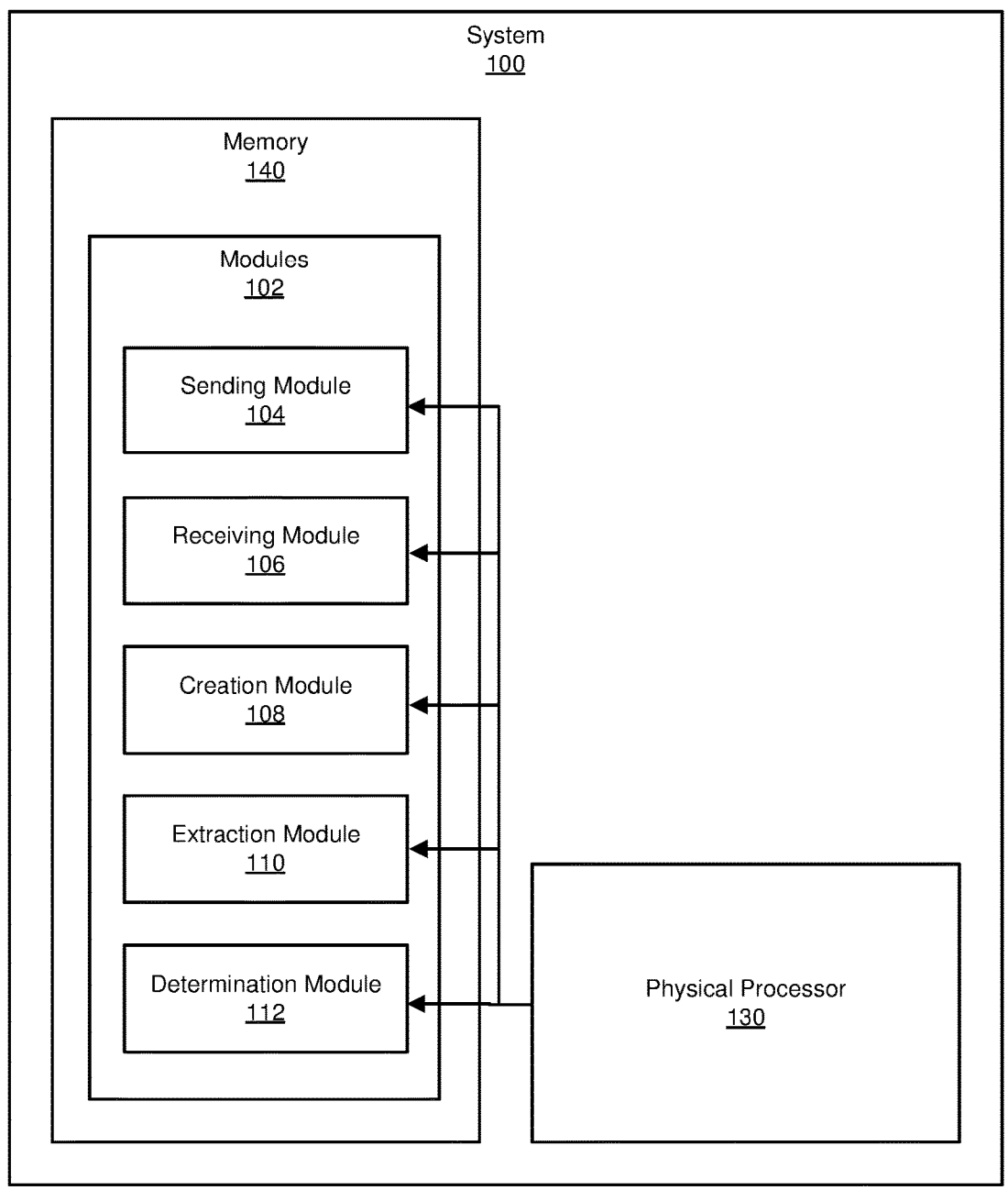
FIG. 1 is a block diagram of an example system for detecting vulnerabilities on servers.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting vulnerabilities on servers. As will be explained in greater detail below, by scanning servers for service information and then creating custom heuristics to automatically parse the service information, the systems and methods described herein may be able to determine which services are running on which servers efficiently and accurately. By creating custom heuristics to automatically parse the service information, the systems and methods described herein may efficiently analyze large numbers of services that send service information in different formats that cannot all be parsed by the same heuristic. By gathering service information in this way, the systems and methods described herein may be able to improve the accuracy and efficiency of a vulnerability score for a server and/or an organization, thereby enabling the owner of the server and/or organization to mitigate any vulnerabilities discovered and reduce the chances of a successful attack targeting those vulnerabilities. In addition, the systems and methods described herein may improve the functioning of a computing device by detecting potential vulnerabilities with increased accuracy and thus reducing the computing device's likelihood of being compromised. These systems and methods may also improve the field of heuristic-based computer security and/or enterprise-level security by creating accurate vulnerability metrics for an organization.

Figure 2:
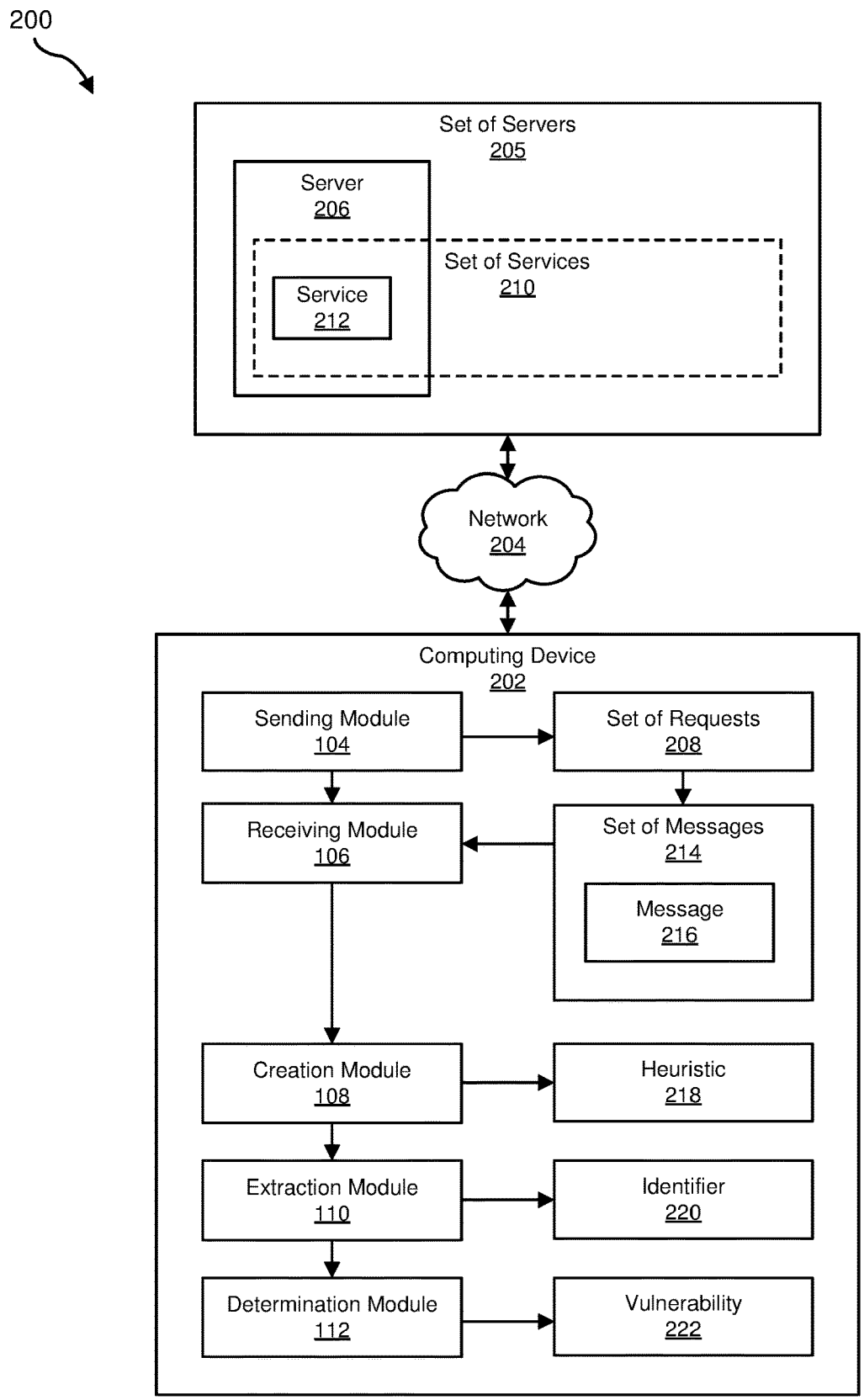
FIG. 2 is a block diagram of an additional example system for detecting vulnerabilities on servers.
Figure 3:
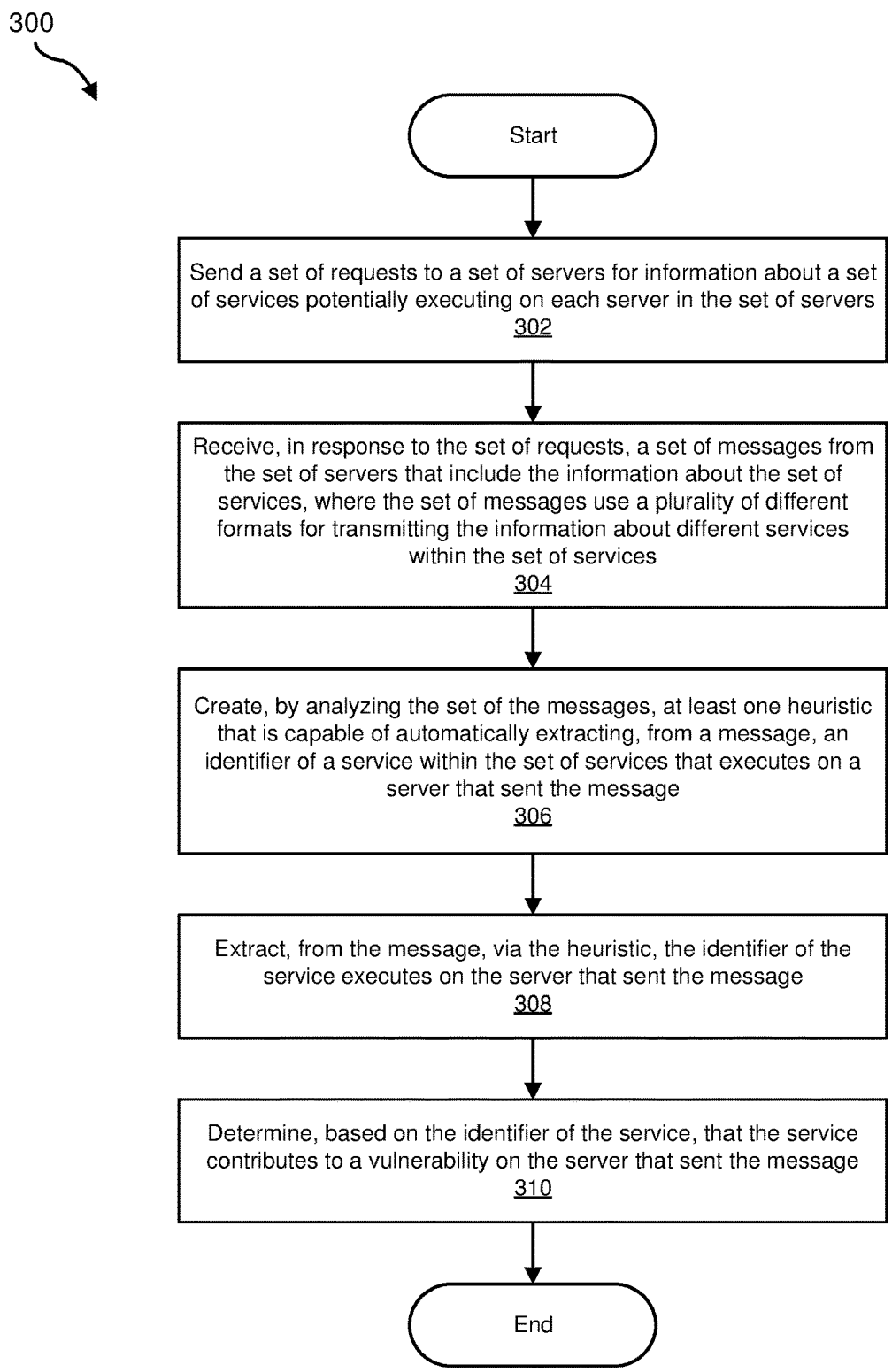
FIG. 3 is a flow diagram of an example method for detecting vulnerabilities on servers.
Figure 4:
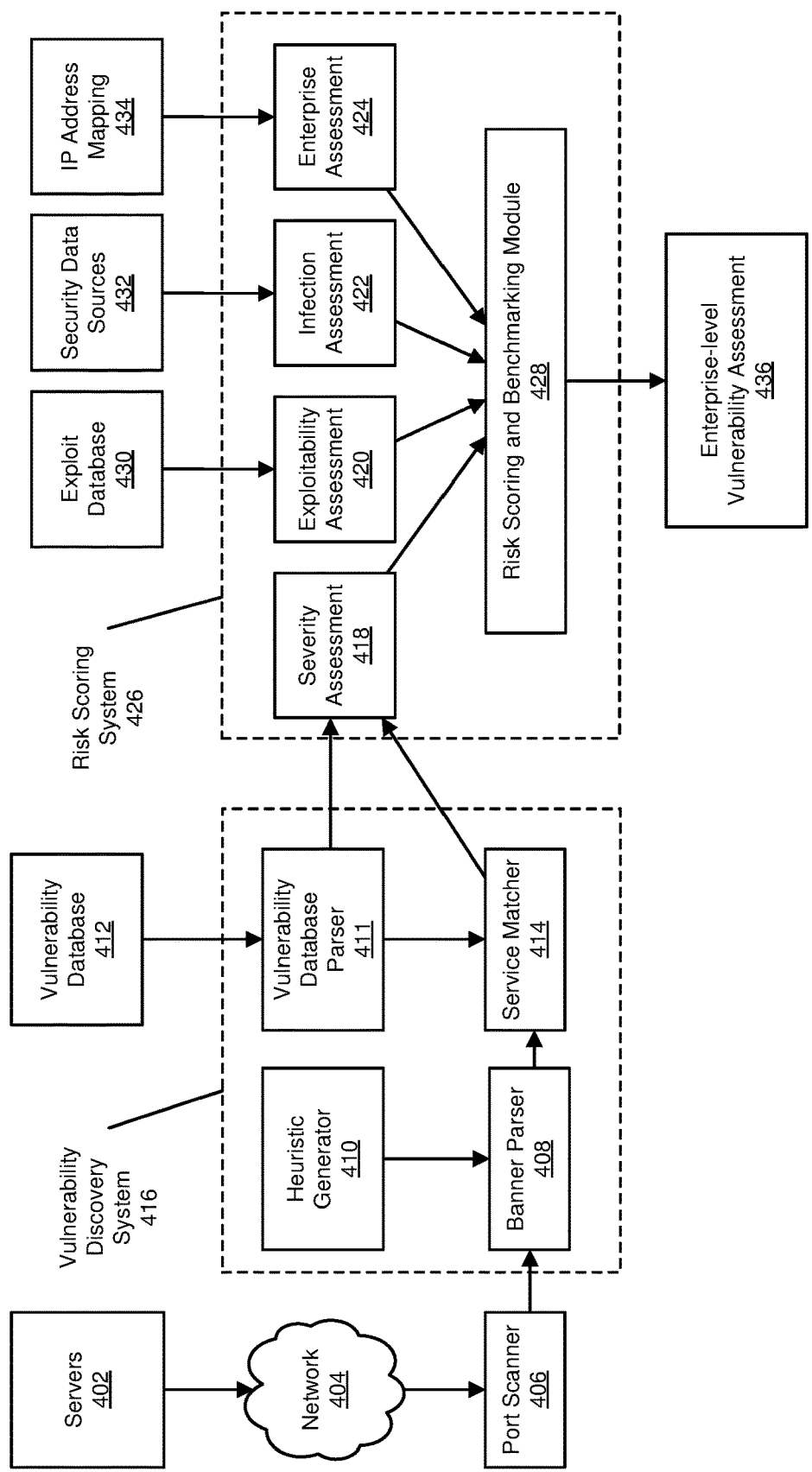
FIG. 4 is a block diagram of an additional example computing system for detecting vulnerabilities on servers.

The following will provide, with reference to FIGS. 1, 2, and 4, detailed descriptions of example systems for detecting vulnerabilities on servers. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of example system 100 for detecting vulnerabilities on servers. As illustrated in this figure, example system 100 may include one or more modules 102 for performing one or more tasks. For example, and as will be explained in greater detail below, example system 100 may include a sending module 104 that sends a set of requests to a set of servers for information about a set of services potentially executing on each server in the set of servers. Example system 100 may additionally include a receiving module 106 that receives, in response to the set of requests, a set of messages from the set of servers that include the information about the set of services, where the set of messages use a plurality of different formats for transmitting the information about different services within the set of services. Example system 100 may also include a creation module 108 that creates, by analyzing the set of the messages, at least one heuristic that is capable of automatically extracting, from a message, an identifier of a service within the set of services that executes on a server that sent the message. Example system 100 may additionally include an extraction module 110 that extracts, from the message, via the heuristic, the identifier of the service executes on the server that sent the message. Example system 100 may also include a determination module 112 that determines, based on the identifier of the service, that the service contributes to a vulnerability on the server that sent the message. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting vulnerabilities on servers. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to detect vulnerabilities on servers. For example, and as will be described in greater detail below, sending module 104 may send a set of requests 208 to a set of servers 205 for information about a set of services 210 potentially executing on each server 206 in set of servers 205. Next, receiving module 106 may receive, in response to set of requests 208, a set of messages 214 from set of servers 205 that include the information about set of services 210, where set of messages 214 use a plurality of different formats for transmitting the information about different services within set of services 210. After receiving set of messages 214, creation module 108 may create, by analyzing set of messages 214, at least one heuristic 218 that is capable of automatically extracting, from a message 216, an identifier 220 of a service 212 within set of services 210 that executes on a server 206 that sent message 216. Next, extraction module 110 may extract, from message 216, via heuristic 218, identifier 220 of service 212 executes on server 206 that sent message 216. Finally, determination module 112 may determine, based on identifier 220 of service 212, that service 212 contributes to a vulnerability 222 on server 206 that sent message 216.

Computing device 202 generally represents any type or form of computing device capable of reading computer-executable instructions. In some embodiments, computing device 202 may be a server configured to calculate vulnerability scores. Additional examples of computing device 202 include, without limitation, laptops, tablets, desktops, security servers, application servers, web servers, storage servers, database servers configured to run certain software applications and/or provide various security, web, storage, and/or database services, and/or any other suitable computing device. Although illustrated as a single entity in FIG. 2, computing device 202 may include and/or represent a plurality of servers that work and/or operate in conjunction with one another.

Server 206 generally represents any type or form of computing device that is capable of executing one or more services. In some embodiments, server 206 may be a public-facing web server connected to the Internet. Additional examples of server 206 include, without limitation, security servers, application servers, web servers, storage servers, and/or database servers configured to run certain software applications and/or provide various security, web, storage, and/or database services.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Set of requests 208 generally represents any type or form of communications sent to a server. Service 212 generally represents any script, application, program, and/or other software capable of executing on a server. Set of services 210 generally represents any list of one or more services. Message 216 generally represents any type or form of communication sent by a server. Set of messages 214 generally represents any group of one or more messages. Heuristic 218 generally represents any algorithm capable of recognizing one or more specified pieces of information within a body of information. Identifier 220 generally represents any type or form of identifier for a service. Vulnerability 222 generally represents any characteristic of a computing device, service executing on a computing device, and/or combination of computing device and service that renders the computing device vulnerable to an attack.

FIG. 3 is a flow diagram of an example computer-implemented method 300 for detecting vulnerabilities on servers. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may send a set of requests to a set of servers for information about a set of services potentially executing on each server in the set of servers. For example, sending module 104 may, as part of computing device 202 in FIG. 2, send set of requests 208 to set of servers 205 for information about set of services 210 potentially executing on each server 206 in set of servers 205.

The term "request," as used herein, generally refers to any communication sent to a server. In some embodiments, a request may be designed to elicit information from a server about one or more services potentially executing on the server. In some examples, a request may be addressed to a particular port and/or service. In one embodiment, a request may be sent as part of a port scan that queries multiple ports on a server to determine the status of those ports (e.g., open, filtered, or closed) and/or the services executing on the server that receive traffic via those ports. Examples of requests include, without limitation, hypertext transfer protocol requests, file transfer protocol requests, simple message transfer protocol requests, transmission control protocol packets, user datagram protocol packets, and/or Internet control message protocol packets.

The term "service," as used herein, generally refers to any script, code, program, application, and/or other software operating on a computing device. Examples of services may include, without limitation, operating systems, database applications, mail applications, file transfer applications, file storage applications, virtual machine applications, and/or web hosting applications.

Sending module 104 may send the set of requests in a variety of contexts. For example, sending module 104 may send a set of requests to a set of ports on a particular server. In another example, sending module 104 may send a set of requests to a set of ports on a set of servers that are all operated by the same organization. Additionally or alternatively, sending module 104 may send requests to several sets of servers that are operated by different organizations. In one example, sending module 104 may send messages to ports 21, 22, 25, 80, 110, 143, 993, and/or 995.

At step 304, one or more of the systems described herein may receive, in response to the set of requests, a set of messages from the set of servers that include the information about the set of services, where the set of messages use a plurality of different formats for transmitting the information about different services within the set of services. For example, receiving module 106 may, as part of computing device 202 in FIG. 2, receive, in response to set of requests 208, set of messages 214 from set of servers 205 that include the information about set of services 210, where set of messages 214 use a plurality of different formats for transmitting the information about different services within set of services 210.

The term "message," as used herein, generally refers to any communication sent by a server. In some embodiments, a message may be sent by a server in response to a request to the server. In one example, a message may be a hypertext transfer protocol response. In some examples, a message may include information about one or more services executing on a server, such as a service banner that identifies the name and/or version of a service executing on the server.

The term "format," as used herein, generally refers to any way in which data is presented and/or transferred. In some embodiments, servers may send messages with different arrangements for the name, version, and/or other information about different services. For example, one service may send information in the format "name (version)/(sub-version)" while another service may send information in the format "name version additional-information."

Receiving module 106 may receive the set of messages in a variety of contexts. For example, receiving module 106 may receive messages sent in response to a port scan of an individual server. In other examples, receiving module 106 may receive messages sent in response to port scans of multiple servers.

At step 306, one or more of the systems described herein may create, by analyzing the set of the messages, at least one heuristic that is capable of automatically extracting, from a message, an identifier of a service within the set of services that executes on a server that sent the message. For example, creation module 108 may, as part of computing device 202 in FIG. 2, create, by analyzing the set of the messages, at least one heuristic 218 that is capable of automatically extracting, from message 216, identifier 220 of service 212 within set of services 210 that executes on server 206 that sent message 216.

The term "heuristic," as used herein, generally refers to any method of deriving information from other information. In some embodiments, a heuristic may locate one or more types of identifiers of a service within a message that includes information about the service. For example, a heuristic may parse the contents of a message to extract the name and/or version of a service. In another example, a heuristic may provide instructions to a parser about how to parse a message. For example, a heuristic may include a regular expression that may be used by a parser to parse a message.

The term "identifier," as used herein, generally refers to any description of a service. In some embodiments, an identifier of a service may include a name of a service. Additionally or alternatively, an identifier of a service may include a version name and/or number of the service. In some examples, an identifier of a service may include a publisher of the service, a service type of the service, and/or additional information about the service.

Creation module 108 may create a heuristic in a variety of ways. In some embodiments, creation module 108 may create multiple heuristics to extract information from multiple different message formats. In some examples, creation module 108 may identify a subset of formats within the plurality of different formats for transmitting the information, where the formats within the subset of formats have similar formats to one another. For example, creation module 108 may use a string similarity measurement such as Levenshtein distance to calculate the similarity between messages and may then group messages with string distances below a predetermined threshold for distance.

In some embodiments, creation module 108 may generate a signature for the subset of formats that matches information formatted using at least one format within the subset of formats. In one embodiment, creation module 108 may use a string alignment library to generate a regular expression that matches information presented in the formats within the subset of similar formats. For example, creation module 108 may use the FRAK library and/or a bioinformatics library designed to create sequence alignments to generate regular expressions that match at least one format in a given subset of similar formats.

In one example, creation module 108 may derive strings from the content of messages and then use the Smith-Waterman algorithm to perform a local sequence alignment on each pair of strings in order to build a phylogenic tree for each string. In this example, creation module 108 may then combine phylogenetic trees using the unweighted pair group method with arithmetic mean (UPGMA) to form one single phylogenetic tree and traverse the resulting phylogenetic tree to build the regular expression. In this example, creation module 108 may use the UPGMA distance function to compare the similarity of protocol banners exposed by servers and services. Creation module 108 may then use this similarity to generate, in a semi-automated way, banner signatures from banners that are similar to each other. In some examples, the systems described herein may store generated banner signatures and may then use previously generated banner signatures to easily and efficiently recognize servers and/or services.

In one embodiment, creation module 108 may create, from the signature, the heuristic. In some embodiments, creation module 108 may enable an analyst to review the automatically generated regular expressions and/or to label positions in the regular expressions where specific pieces of information, such as service names and/or versions, are located.

At step 308, one or more of the systems described herein may extract, from the message, via the heuristic, the identifier of the service executes on the server that sent the message. For example, extraction module 110 may, as part of computing device 202 in FIG. 2, extract, from message 216, via heuristic 218, identifier 220 of service 212 executes on server 206 that sent message 216.

Extraction module 110 may extract the identifier from the message in a variety of contexts. For example, extraction module 110 may use a heuristic created by analyzing the message to extract the identifier from the message. In another example, extraction module 110 may use a stored heuristic previously created by analyzing a similar message to extract the identifier from the message. In some embodiments, extraction module 110 may extract multiple identifiers of a service from a message. In some examples, extraction module 110 may extract a name, publisher, and/or version of a service from a message. In one example, extraction module 110 may use a regular expression to extract information located at specific expected locations in the message. For example, extraction module 110 may apply the regular expression "(?<servicename>\w+) v. (?<versionnum>\d{1,2}.\d{1,2})\((?<publisher>\w+)\)?" to the message "Email Server v. 1.12 (AppPublisher)" to extract the name "Email Server," the publisher "AppPublisher," and/or the version "1.12" from the message.

In one embodiment, extraction module 110 may receive, from receiving module 106 and/or creation module 108, messages from which to extract data in the format of a tuple containing the Internet protocol (IP) address of the server that sent the message, the port number on which the service is communicating, and/or the service banner sent by the server in response to the request for information about the service. In some examples, extraction module 110 may receive a list of tuples representing information about a variety of services executing on a number of servers.

At step 310, one or more of the systems described herein may determine, based on the identifier of the service, that the service contributes to a vulnerability on the server that sent the message. For example, determination module 112 may, as part of computing device 202 in FIG. 2, determine, based on identifier 220 of service 212, that service 212 contributes to vulnerability 222 on server 206 that sent message 216.

The term "vulnerability," as used herein, generally refers to any characteristic of a computing device, a service, and/or an interaction between one or more services and/or computing devices that enables an attacker to perform a malicious action on the computing device that has the vulnerability. In some examples, a vulnerability may allow an attacker to access protected data, make changes to protected configurations and/or code, and/or perform other actions that are not typically allowed for unauthorized users. Examples of vulnerabilities may include, without limitation, code injection, structured query language injection, information leakage, cross-site scripting, cross-site request forgery, and/or privilege escalation.

Determination module 112 may determine that the service contributes to the vulnerability in a variety of ways. In one embodiment, determination module 112 may determine, based on the identifier of the service, that the service contributes to the vulnerability on the server that sent the message by retrieving, from an external resource, vulnerability data for the set of services and using the identifier to locate the service in the vulnerability data. For example, determination module 112 may query a publicly-available vulnerability database for a list of all existing and reported software vulnerabilities and the affected vendor, name, and/or version number. In this example, determination module 112 may then match the list of vulnerable services against the list of services found executing on servers to identify vulnerable servers. In another embodiment, determination module 112 may create a list of names, versions, and/or vendors of services identified on servers and may query a vulnerability database to determine whether those specific services are known to have vulnerabilities.

In some examples, systems described herein may perform a security action in response to determining that the service contributes to the vulnerability. In one embodiment, the security action may include remediating the vulnerability on the server, for example by reconfiguring, patching, and/or updating the service that contributes to the vulnerability. In another example, the systems described herein may inform an administrator of the server about the vulnerability. In some embodiments, the systems described herein may calculate a vulnerability score that includes the vulnerability and may inform an administrator of the server about the vulnerability score.

In some examples, systems described herein may calculate a vulnerability score for an organization that owns the server by identifying a set of servers are owned by the organization, identifying a set of services executing on those services, generating a set of vulnerabilities scores for the set of services, and calculating the vulnerability score for the organization based on the set of vulnerability scores for the set of services executing on the servers owned by the organization. In one embodiment, as illustrated in FIG. 4, the systems described herein may evaluate a set of servers 402 via a network 404. In some examples, network 404 may include a local area network, a remote network (i.e., a cloud network), and/or the Internet.

In one embodiment, the systems described herein may include a port scanner 406 that performs a port scan on servers 402. Port scanner 406 may include any type of application that is capable of sending messages and/or packets to various ports on a server and evaluating the responses from the server to determine the status of ports and/or services using those ports. In this example, the systems described herein may include a vulnerability discovery system 416 that may include a banner parser 408 that automatically parses service banners using one or more heuristics generated and/or stored by a heuristic generator 410. In some examples, vulnerability discovery system 416 may also include a vulnerability database parser 411 that queries and/or parses results from a vulnerability database 412. In some embodiments, vulnerability database 412 may be an external database that is not owned and/or operated by an administrator of the systems described herein. In other embodiments, the systems described herein may include vulnerability database 412. In one example, vulnerability database parser 411 and/or banner parser 408 may send results to a service matcher 414 that may match services found on servers 402 with services listed in vulnerability database 412 as having one or more vulnerabilities.

In some embodiments, the systems described herein may also include a risk scoring system 426. In one embodiment, risk scoring system 426 may include a severity assessment 418 that may receive service vulnerability information from service matcher 414 and/or vulnerability risk score information from vulnerability database parser 411. In one embodiment, severity assessment 418 may calculate vulnerability scores for vulnerabilities found on services operating on servers 402 in order to compute a preliminary vulnerability metric for servers 402.

In one embodiment, risk scoring system 426 may include additional assessments, such as an exploitability assessment 420, an infection assessment 422, and/or an enterprise assessment 424. In some examples, exploitability assessment 420 may query an exploit database 430 for information on exploits that may affect servers 402. In some embodiments, exploit database 430 may be an external resource while in other embodiments, the systems described herein may include exploit database 430. In some examples, infection assessment 422 may query one or more security data sources 432 for information on infections that may affect servers 402. In some embodiments, security data sources 432 may include external resources while in other embodiments, the systems described herein may include security data sources 432. Additionally or alternatively, enterprise assessment 424 may query an IP address mapping 434 for information on which of servers 402 are owned by which organization. In some embodiments, IP address mapping 434 may be an external resource while in other embodiments, the systems described herein may include IP address mapping 434. In some examples, all of servers 402 may be owned by the same organization, while in other examples, the systems described herein may simultaneously analyze servers owned by multiple organizations.

In some embodiments, severity assessment 418, exploitability assessment 420, infection assessment 422, and/or enterprise assessment 424 may all send information to a risk scoring and benchmarking module 428 that may produce an enterprise-level vulnerability assessment 436 for one or more organizations that operate servers within servers 402. In some embodiments, enterprise-level vulnerability assessment 436 may include an overall vulnerability metric for an organization based on services that contribute to vulnerabilities on public-facing servers operated by the organization and/or the risk and/or severity of exploits and/or infections relating to those vulnerabilities. In one embodiment, enterprise-level vulnerability assessment 436 may include several metrics in different categories split up by messaging protocol, application type, and/or other characteristics and/or an overall metric summing up the category metrics. For example, enterprise-level vulnerability assessment 436 may include a score of A-F for an organization in each of the categories of hypertext transfer protocol applications and/or servers, secure socket layer applications and/or servers, and/or simple mail transfer protocol applications and/or servers.

In some embodiments, risk scoring and benchmarking module 428 may use a weighted formula leveraging numerous features from several categories to produce enterprise-level vulnerability assessment 436. Examples of categories may include, without limitation, port and/or IP features, common vulnerabilities and exposures (CVE) features, common vulnerability scoring system (CVSS) features, and/or temporal features. Examples of port and/or IP features may include, without limitation, vulnerable IP address count per unpatched host, vulnerable port count per unpatched host, average vulnerable ports per IP address per unpatched host, patched IP address count per patched host, patched port count per patched host, and/or average patched ports per IP address per patched host. Examples of CVE features may include, without limitation, average CVE per port per unpatched host, average CVE per IP address per unpatched host, patched CVE count per patched host, CVE count per unpatched host, average patched CVE per port per patched host, and/or average patched CVE per IP address per patched host. Examples of CVSS related features may include, without limitation, average CVE CVSS score per patched host, minimum CVE CVSS score per patched host, maximum CVE CVSS score per patched host, average CVE CVSS score per unpatched host, minimum CVE CVSS score per unpatched host, and/or maximum CVE CVSS score per unpatched host. Examples of temporal features may include, without limitation, average vulnerable window per patched host, maximum vulnerable window per patched host, average CVE age per patched host, minimum CVE age per patched host, maximum CVE age per patched host, average CVE age per unpatched host, minimum CVE age per unpatched host, and/or maximum CVE age per unpatched host. The term "host," as used herein, generally refers to any type of server and/or computing device.

In some examples, the systems described herein may calculate a weighted average risk score for an organization by, for each feature used in the assessment, multiplying the ranking of the organization for the feature (e.g., the average number of vulnerable ports per server, the average age of unpatched vulnerabilities in weeks, and/or the average CVSS score of each server) by a predetermined weight assigned to that feature, then summing the total value for all the features and dividing that total by the size of the set of features used to arrive at an overall vulnerability score. In some embodiments, the systems described herein may create vulnerability metrics such as weighted average risk scores for the same set of servers and/or organizations at regular intervals, such as once a week, once a month, and/or once a quarter. In one embodiment, the systems described herein may combine and/or compare vulnerability metrics created at different times.

In one embodiment, the systems described herein may create a temporal vulnerability metric for an organization that includes the vulnerability score for the organization and at least one previous vulnerability score for the organization and/or may rank the temporal vulnerability metric for the organization against at least one temporal vulnerability metric for at least one additional organization. In some embodiments, the systems described herein may create temporal peer profiles by comparing an organization's historical vulnerability metrics against historical vulnerability metrics for similar organizations. In some examples, the systems described herein may create ongoing temporal peer profiles that periodically compare new vulnerability metrics for an organization against new vulnerability metrics for peer organizations in light of all of the organizations' previous vulnerability metrics. In some embodiments, temporal peer profiles may enable an adjustable level of granularity by including scores for various individual features that make up an organization's overall security metric, such as the number of vulnerable ports and/or IP addresses at a given time.

As explained in connection with method 300 above, the systems and methods described herein may scan external (i.e., Internet-facing) machines for services and/or applications running on the machines, retrieve the handshake banner for each of these services, extract from the banners information to precisely identify the software applications that generated the banners, extract information about all existing and reported software vulnerabilities gathered from publicly available software vulnerability databases, and find the intersection between the software applications running on the scanned machines and the database of software vulnerabilities. In some examples, the systems and methods described herein may perform an outside-in assessment of an organization's servers and/or other devices without cooperation from the organization. In some embodiments, the systems and methods described herein may generate a vulnerability score based on a collection of weighted features in different categories and may track an organization's security posture over time and/or compare an organization's security posture to the security postures of the organization's peers. By automatically scanning public-facing servers for services and parsing service banners, and retrieving information from vulnerability databases, the systems and methods described herein may efficiently perform large-scale vulnerability assessments. In some examples, organizations may use the vulnerability assessments created by the systems and methods described herein to remediate vulnerabilities, improve security postures, create cyber-insurance risk assessments, and/or determine where resources for vulnerability remediation should be directed.

Figure 5:
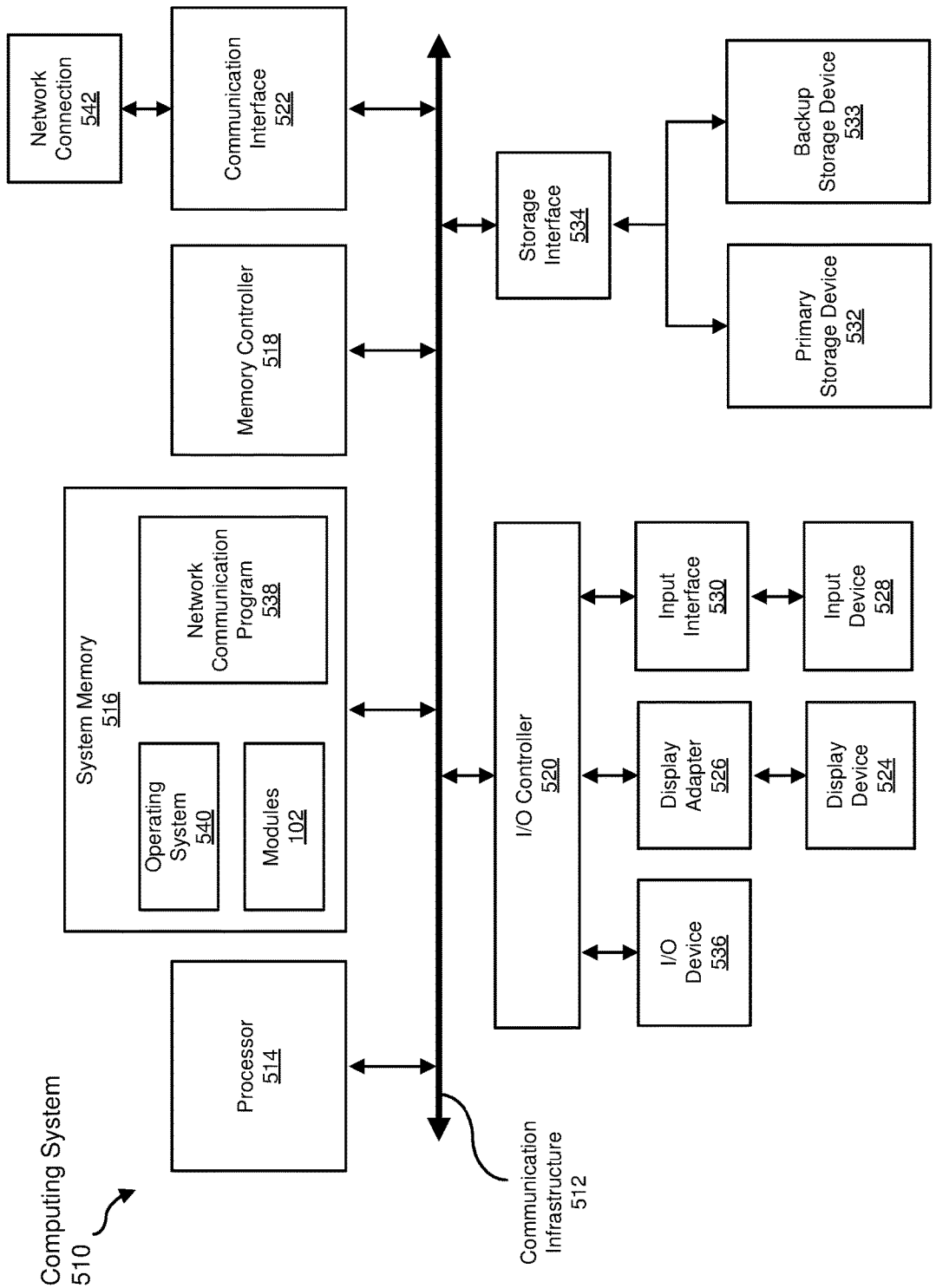
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
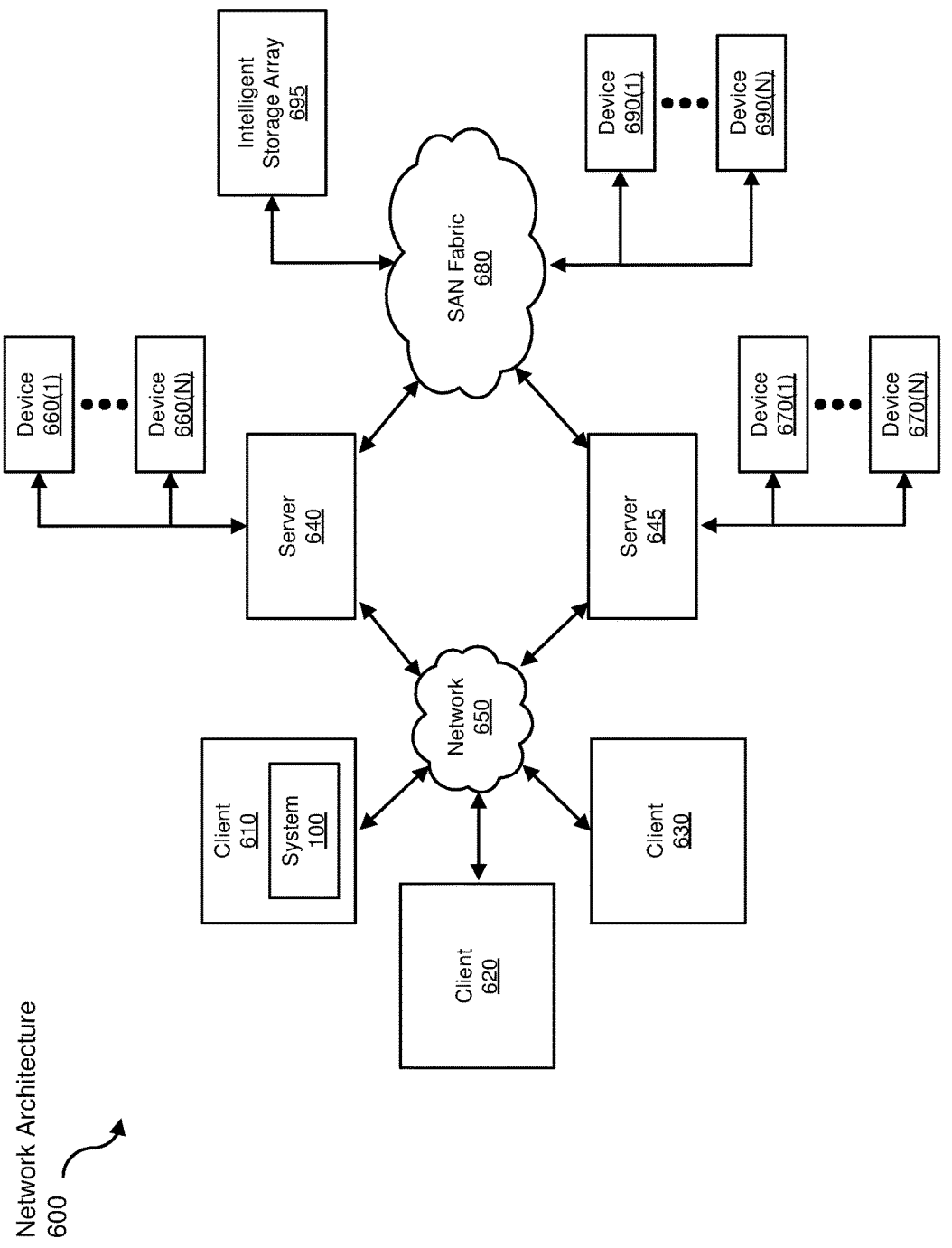
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for detecting vulnerabilities on servers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive service banner data to be transformed, transform the service banner data by parsing the service banner data with a heuristic, output a result of the transformation to a vulnerability list, use the result of the transformation to identify vulnerabilities in servers, and store the result of the transformation to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting vulnerabilities on servers, at least a portion of the method being performed by a computing device comprising at least one processor, the method comprising:

sending a set of requests to a set of servers for information about a set of services potentially executing on each server in the set of servers;

receiving, in response to the set of requests, a set of messages from the set of servers that comprise the information about the set of services, wherein the set of messages use a plurality of different formats for transmitting the information about different services within the set of services;

creating, by analyzing the set of the messages, at least one heuristic that is capable of automatically extracting, from a message, an identifier of a service within the set of services that executes on a server that sent the message;

extracting, from the message, via the heuristic, the identifier of the service executes on the server that sent the message; and determining, based on the identifier of the service, that the service contributes to a vulnerability on the server that sent the message.

2. The computer-implemented method of claim 1, further comprising performing a security action in response to determining that the service contributes to the vulnerability.

3. The computer-implemented method of claim 2, wherein performing the security action comprises remediating the vulnerability on the server.

4. The computer-implemented method of claim 1, further comprising calculating a vulnerability score for an organization that owns the server by:
identifying an additional set of servers that comprise servers owned by the organization that owns the server;
identifying a set of services by extracting, from at least one additional message sent from each server within the additional set of servers, via the heuristic, at least one additional identifier of at least one additional service executing on the server within the additional set of servers that sent the additional message;
generating a set of vulnerabilities scores by determining, for each service in the set of services, a vulnerability score for a vulnerability contributed to by the service; and
calculating the vulnerability score for the organization based on the set of vulnerability scores for the set of services executing on the servers owned by the organization.

5. The computer-implemented method of claim 4, further comprising:
creating a temporal vulnerability metric for the organization that comprises the vulnerability score for the organization and at least one previous vulnerability score for the organization; and
ranking the temporal vulnerability metric for the organization against at least one temporal vulnerability metric for at least one additional organization.

6. The computer-implemented method of claim 1, wherein determining, based on the identifier of the service, that the service contributes to the vulnerability on the server that sent the message comprises:
retrieving, from an external resource, vulnerability data for the set of services; and
using the identifier to locate the service in the vulnerability data.

7. The computer-implemented method of claim 1, wherein creating the heuristic comprises:
identifying a subset of formats within the plurality of different formats for transmitting the information, wherein the subset of formats comprises similar formats;
generating a signature for the subset of formats that matches information formatted using at least one format within the subset of formats; and
creating, from the signature, the heuristic.

8. The computer-implemented method of claim 7, wherein the signature comprises a regular expression that locates the identifier of the service within the message.

9. A system for detecting vulnerabilities on servers, the system comprising:
a sending module, stored in memory, that sends a set of requests to a set of servers for information about a set of services potentially executing on each server in the set of servers;
a receiving module, stored in memory, that receives, in response to the set of requests, a set of messages from the set of servers that comprise the information about the set of services, wherein the set of messages use a plurality of different formats for transmitting the information about different services within the set of services;
a creation module, stored in memory, that creates, by analyzing the set of the messages, at least one heuristic that is capable of automatically extracting, from a message, an identifier of a service within the set of services that executes on a server that sent the message;
an extraction module, stored in memory, that extracts, from the message, via the heuristic, the identifier of the service executes on the server that sent the message;
a determination module, stored in memory, that determines, based on the identifier of the service, that the service contributes to a vulnerability on the server that sent the message; and
at least one physical processor configured to execute the sending module, the receiving module, the creation module, the extraction module, and the determination module.

10. The system of claim 9, wherein the determination module performs a security action in response to determining that the service contributes to the vulnerability.

11. The system of claim 10, wherein the determination module performs the security action by remediating the vulnerability on the server.

12. The system of claim 9, wherein the determination module calculates a vulnerability score for an organization that owns the server by:
identifying an additional set of servers that comprise servers owned by the organization that owns the server;
identifying a set of services by extracting, from at least one additional message sent from each server within the additional set of servers, via the heuristic, at least one additional identifier of at least one additional service executing on the server within the additional set of servers that sent the additional message;
generating a set of vulnerabilities scores by determining, for each service in the set of services, a vulnerability score for a vulnerability contributed to by the service; and
calculating the vulnerability score for the organization based on the set of vulnerability scores for the set of services executing on the servers owned by the organization.

13. The system of claim 12, wherein the determination module calculates the vulnerability score by:
creating a temporal vulnerability metric for the organization that comprises the vulnerability score for the organization and at least one previous vulnerability score for the organization; and
ranking the temporal vulnerability metric for the organization against at least one temporal vulnerability metric for at least one additional organization.

14. The system of claim 9, wherein the determination module determines, based on the identifier of the service, that the service contributes to the vulnerability on the server that sent the message by:
   retrieving, from an external resource, vulnerability data for the set of services; and
   using the identifier to locate the service in the vulnerability data.

15. The system of claim 9, wherein the creation module creates the heuristic by:
   identifying a subset of formats within the plurality of different formats for transmitting the information, wherein the subset of formats comprises similar formats;
   generating a signature for the subset of formats that matches information formatted using at least one format within the subset of formats; and
   creating, from the signature, the heuristic.

16. The system of claim 15, wherein the signature comprises a regular expression that locates the identifier of the service within the message.

17. A non-transitory computer-readable medium comprising one or more computer-readable instructions that, when executed by at least one processor of a computing device, cause the computing device to:
   send a set of requests to a set of servers for information about a set of services potentially executing on each server in the set of servers;
   receive, in response to the set of requests, a set of messages from the set of servers that comprise the information about the set of services, wherein the set of messages use a plurality of different formats for transmitting the information about different services within the set of services;
   create, by analyzing the set of the messages, at least one heuristic that is capable of automatically extracting, from a message, an identifier of a service within the set of services that executes on a server that sent the message;
   extract, from the message, via the heuristic, the identifier of the service executes on the server that sent the message; and
   determine, based on the identifier of the service, that the service contributes to a vulnerability on the server that sent the message.

18. The non-transitory computer-readable medium of claim 17, wherein the one or more computer-readable instructions cause the computing device to perform a security action in response to determining that the service contributes to the vulnerability.

19. The non-transitory computer-readable medium of claim 18, wherein the one or more computer-readable instructions cause the computing device to perform the security action by remediating the vulnerability on the server.

20. The non-transitory computer-readable medium of claim 17, wherein the one or more computer-readable instructions cause the computing device to calculate a vulnerability score for an organization that owns the server by:
   identifying an additional set of servers that comprise servers owned by the organization that owns the server;
   identifying a set of services by extracting, from at least one additional message sent from each server within the additional set of servers, via the heuristic, at least one additional identifier of at least one additional service executing on the server within the additional set of servers that sent the additional message;
   generating a set of vulnerabilities scores by determining, for each service in the set of services, a vulnerability score for a vulnerability contributed to by the service; and
   calculating the vulnerability score for the organization based on the set of vulnerability scores for the set of services executing on the servers owned by the organization.

* * * * *